April 15, 1930. C. REEVES 1,754,647
VALVE MECHANISM FOR INTERNAL COMBUSTION ENGINES
Original Filed Jan. 22, 1925 3 Sheets-Sheet 2
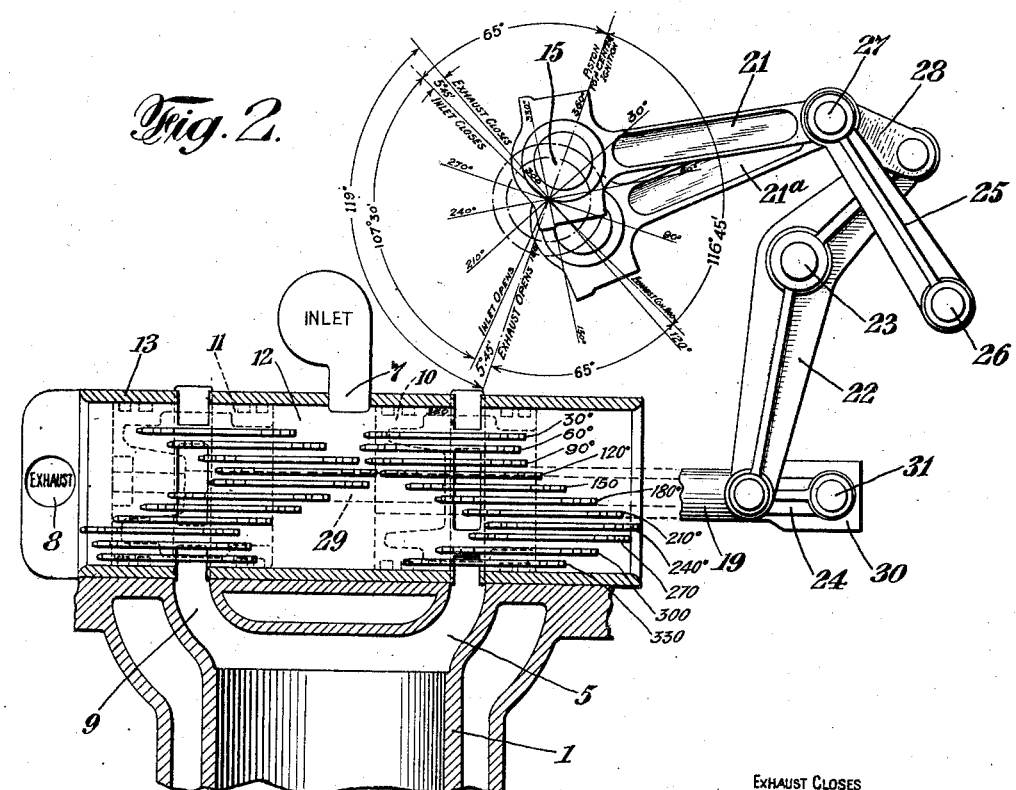
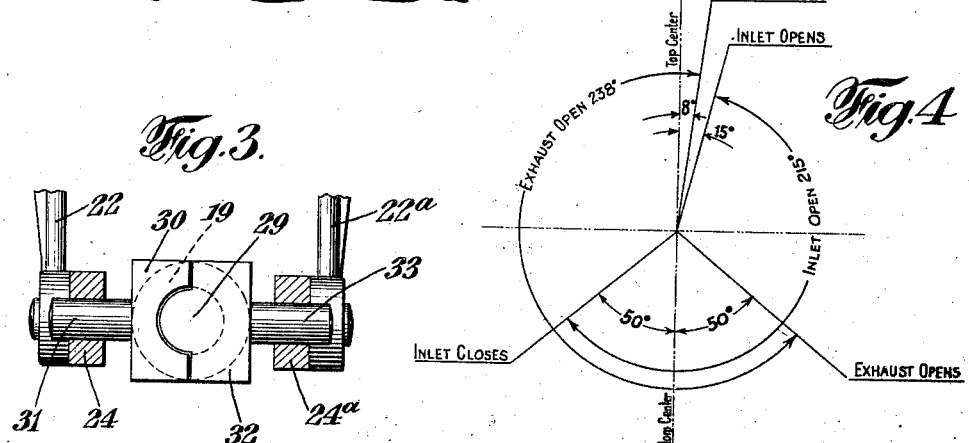

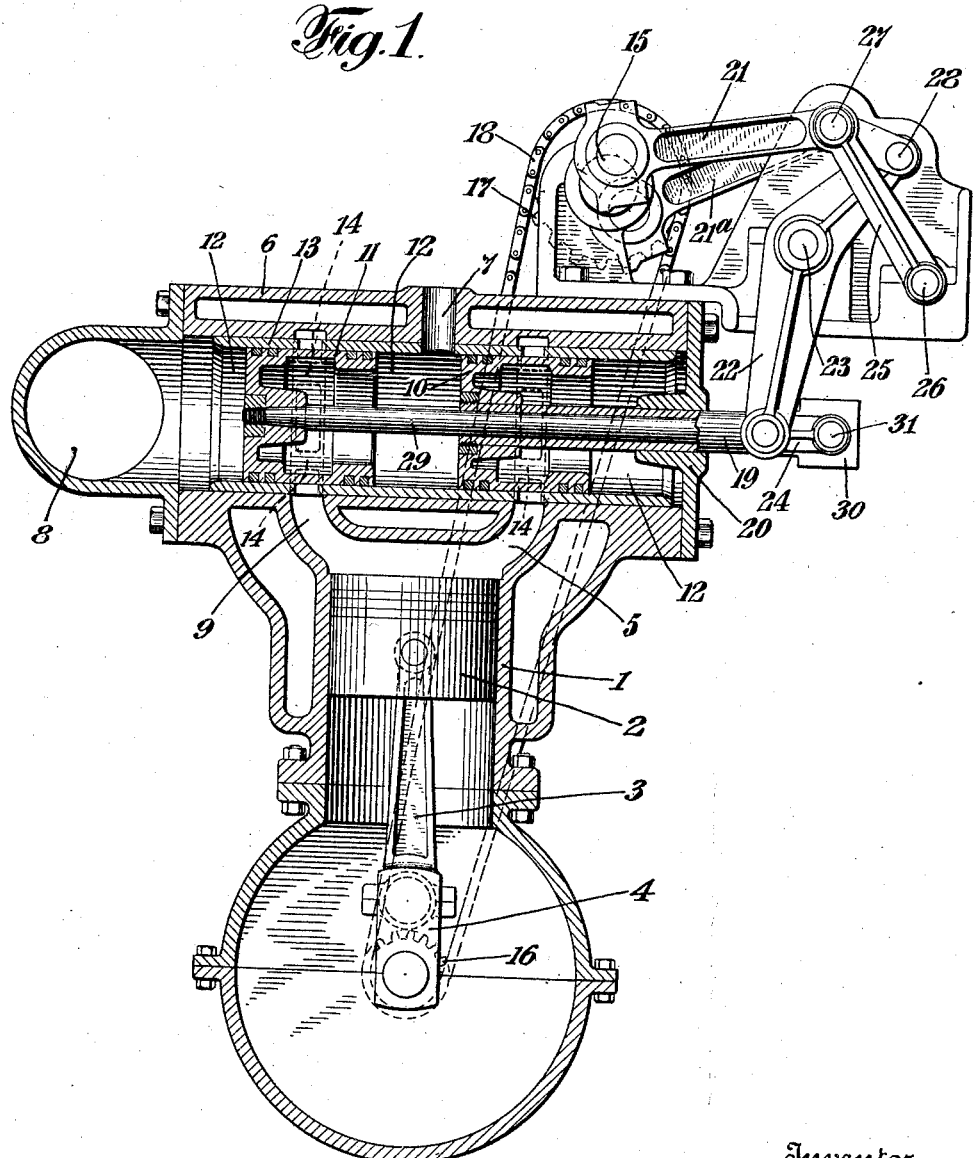

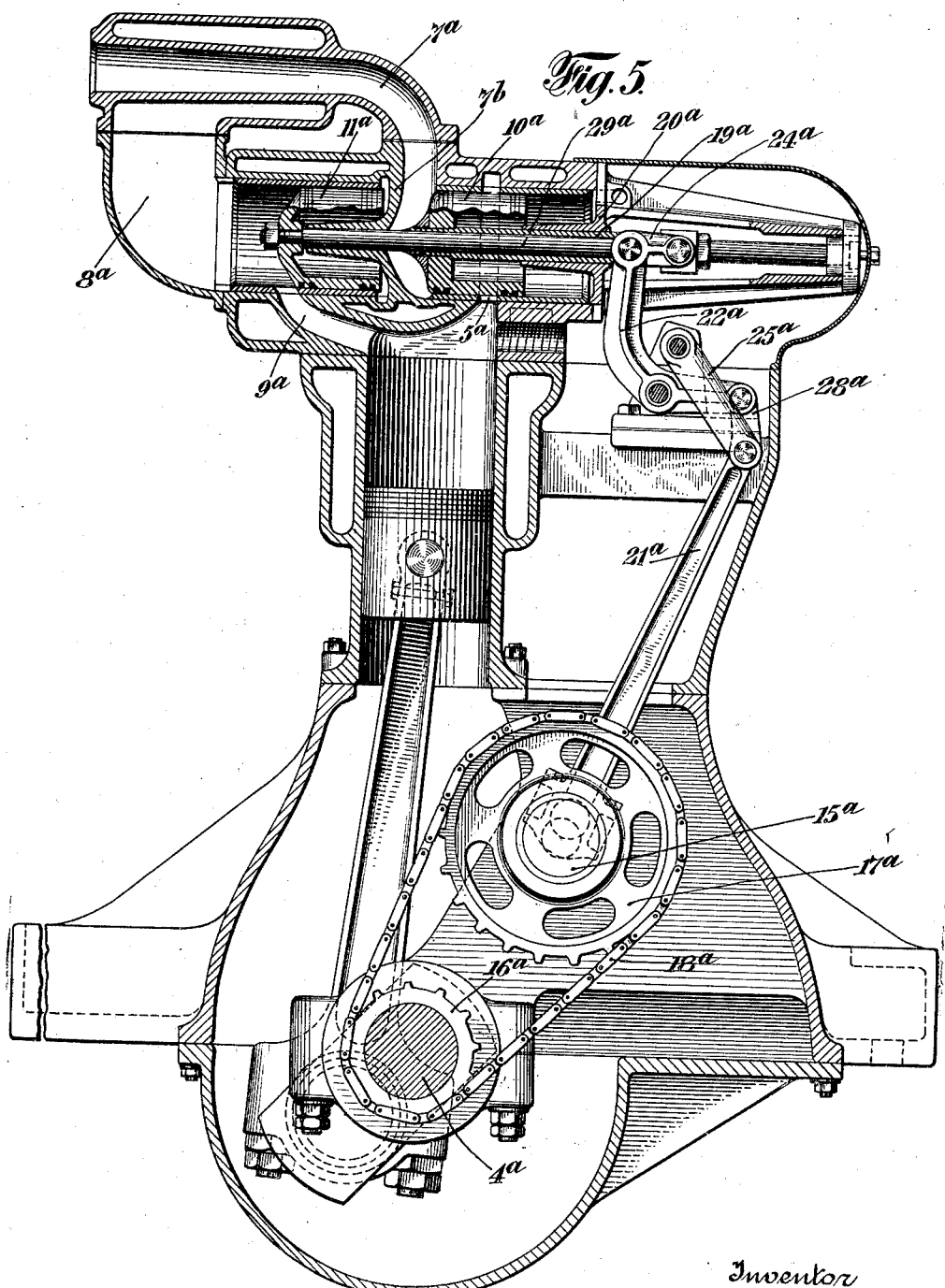

Patented Apr. 15, 1930

1,754,647

UNITED STATES PATENT OFFICE

CLIFTON REEVES, OF TRENTON, NEW JERSEY

VALVE MECHANISM FOR INTERNAL-COMBUSTION ENGINES

Application filed January 22, 1925, Serial No. 4,100. Renewed April 17, 1929.

The primary object of the invention is to provide an efficient valve actuating mechanism for internal combustion engines, by which the valve be moved back and forth across the port, instead of being moved toward and from a valve seat as is the case with the poppet valve motor in present day use. The invention aims to eliminate the inherent disadvantages of the poppet valve, such as the noise caused by engagement with the seat and the engagement of the cams with the valve rods, inaccuracies in timing due to wear, leakage caused by pitting or carbonization of the valve seats, etc., without however employing a valve structure or actuating mechanism which would be prohibitive from the standpoint of expense, or involve mechanical difficulties which would render the mechanism undesirable from the practical standpoint. For example, the members which actuate the valve must usually derive their motion from some rotating part associated with the engine structure, and the change from a rotary, to the reciprocating motion desired to be imparted to the valve, tends to cause the valve member to move relatively slowly near the extremities of its path of travel, while for efficient operation it is desirable that the valve member shall open and close the port quickly and maintain a full opening of the port for a relatively long period.

It is the object of the present invention to provide a valve actuating mechanism which will provide the necessary motion above mentioned for the valve, and which will also be positively connected to the valve, thus avoiding the noise, shocks and wear which would be incident to the operation of the valve member by an actuating mechanism involving parts such as cams which must strike substantially hammer blows at high speed to move the valve as desired. Such actuating mechanism also produces the desired port openings without necessitating the use of a plurality of sleeve valves or the like moving relative to each other and their common port to obtain the proper speed and period of port opening and closing, and enables a single valve member to share the purpose.

In short, the invention aims to provide a valve actuating mechanism which is positively connected to a valve of the type which oscillates or reciprocates back and forth across its port, to move the latter as required for the cycle of an internal combustion engine, without involving undue complication and cost, or mechanical difficulties which would render the mechanism impractical. Further objects and advantages of the invention will be in part obvious and in part specifically pointed out in the description hereinafter contained, which, taken in connection with the accompanying drawings discloses certain preferred embodiments thereof; such embodiments, however, are to be considered merely as illustrative of its principles. In the drawings:

Fig. 1 is a central section of an internal combustion engine cylinder and associated parts provided with a valve mechanism operating in accordance with the invention.

Fig. 2 is a diagrammatic view illustrating the positions assumed by the valves at different periods during the cycle of the engine.

Fig. 3 is an end view partly in section showing the detailed structure of certain parts of the valve-actuating mechanism.

Fig. 4 is a diagram showing the angles of opening of the inlet and exhaust valves.

Fig. 5 is a view similar to Fig. 1, but illustrating a form of the invention which is modified from the one shown in Fig. 1, mainly as regards the shape of the gas passages associated with the port, and the location of the valve actuating mechanism.

The invention is illustrated in Fig. 1 as applied to an internal combustion engine having a cylinder block 1, piston 2, connecting rod 3 and a crank shaft 4, all of which parts will not be further described as their detailed structure is not essential to the present invention.

The inlet port 5 of cylinder 1 leads to some point adjacent the cylinder block where it is convenient to locate the valve mechanism, the present embodiment showing such mechanism as carried by a cylinder head 6 having intake and exhaust passages 7 and 8 respectively, there being also an exhaust port 9 leading from cylinder 1, all as appears in Fig. 1.

An inlet valve 10 controls communication between passage 7 and inlet port 5, which valve may be and preferably is of the piston type, one of the features of the present mechanism being that it enables valves of the piston type to be employed with satisfactory performance. A similar piston valve 11 may be employed in connection with the exhaust port 9, such valves in the present instance being coaxially disposed in a common valve chamber 12 having a liner or sleeve 13 provided with bridges 14 opposite the ports 5 and 9 to afford free passage of gas all the way around the sleeve between the bridges 14, when the valves are open.

The valve 10 is actuated positively by a mechanism deriving its motion from some convenient element of the engine, for example, an auxiliary shaft 15, driven from crank shaft 4 by means of sprockets 16, 17 and chain 18. In the present form valve 10 is provided with a stem 19 extending outwardly through a valve head 20, and motion for reciprocating the valve is derived from auxiliary shaft 15 through the medium of a connecting rod 21 eccentrically driven by shaft 15, and a rocker arm 22 pivoted at 23 and connected at its lower end to valve rod 19 by means of link 24.

The valve 10 is designed to uncover inlet port 5 when near one end of its stroke, and therefore at a period in the travel of connecting rod 21 when the linear movement thereof is relatively small, tending to produce only a correspondingly slow motion of the valve. I therefore modify the motion of the valve-actuating mechanism in order to obtain a quick motion of valve 10 at the time it opens and closes port 5, by interposing an accelerating gear in such mechanism. In the present instance this accelerating gear acts to decrease the radius of the motion transmitted to rocker arm 22 from connecting rod 21 in such manner that, at the desired time the angular motion transmitted to rocker arm 22 is augmented for a given motion of connecting rod 21; as shown, an arm 25 swings radially about its pivot 26 and is pivotally connected at 27 to connecting rod 21; a link 28 is also pivoted between the point 27 and the upper end of rocker arm 22.

The motions imparted to the valve 10 are more clearly apparent from Fig. 2, which shows the actuating mechanism at the time when piston 2 of the engine is just beginning its ignition stroke. The shaft 15 being run at half the speed of the engine, at the time when the piston 2 has moved 60° through its ignition stroke, the valve 10 will have advanced from the position shown in dotted lines in Fig. 2 to the position marked 30° therein; as the cycle of the engine continues, inlet valve 10 recedes to the positions marked 90°, 120°, 150° and 180° until the engine has completed its exhaust stroke and the intake stroke is beginning; shortly after, the inlet valve uncovers inlet port 5 and leaves said port open through the positions marked 210°, 240°, 270° and nearly up to the 300° position, at which time the piston 2 has completed its suction stroke and compression has begun. With a valve-actuating mechanism of the type described, it is possible to obtain a valve timing approximating the diagram shown in Fig. 4, wherein the inlet valve opens about 15° after the beginning of the suction stroke, and closes after the compression stroke proceeds about 50°; thus the valve-actuating mechanism is positive, eliminating the unreliable action of springs, and nevertheless the valve timing permits the proper cycle to be obtained for the best performance of ordinary gas engines. The above actuating mechanism requires the use only of single valve 10 to obtain the necessary rapidity and period of port opening and closing, and the valve member need not be made so long as to involve difficulties due to undistributed temperatures. Furthermore, leakage through the valve due to wear will be largely overcome, and the actuating mechanism will run without shocks or sudden impacts, and such wear as does occur will not result in inaccuracies in timing due to the positive connections between parts.

The exhaust valve 11 may be operated by a similar mechanism. In the present embodiment the parts for actuating the exhaust valve are grouped with those previously described in connection with the inlet valve, and the exhaust rod 29 extends through rod 19, the latter being made hollow, to an actuating mechanism as above described. As appears from Fig. 2, the connecting rod 21ᵃ which forms a part of the exhaust valve actuating mechanism is angularly offset with regard to connecting rod 21, the proper amount to open and close the exhaust port 9 at the desired times. As the valve mechanism appears in Fig. 2, the parts which move the exhaust valve are directly behind members 22, 25 and 28, and as the cycle of the engine continues the exhaust valve 11 recedes until, shortly after the 60° position has been reached, the exhaust port 9 is uncovered, the piston 2 being at that time about 50° from the end of its ignition stroke; the exhaust valve then remains open as shown in Fig. 2 until slightly after the 180° position has been passed, at which time the piston 2 has completed its exhaust stroke and is about 8° beyond the beginning of its suction stroke. From Fig. 2 it also will be noted that the exhaust valve is moving quickly at the time it opens and closes exhaust port 9. The valves 10 and 11 are not affected by unequal pressures in opening and closing, and can be made relatively short since they need not be provided with intermediate openings for permitting communication to the ports 5 and 9 during intermediate points in the travel of the valves. Thus the valves may operate smoothly, without undue strains and wear caused by temperature differences, unduly long bearing surfaces, etc. As appears from Fig. 2, however, the travel of the valves may readily be made sufficient to wipe along the entire length of the walls of chamber 12.

In Fig. 3 I have illustrated one method of connecting the inlet and exhaust valve stems to their actuating mechanisms, in instances where telescoping valve stems are employed. As shown in this figure, a sector of the hollow valve stem 19 is cut away at its outer end, and a block 30 connected to the remaining portion of the outer end of stem 19, such block having a pin 31 which receives link 24 above mentioned. The exhaust valve stem 29 may then be provided with a block 32 sliding in the cut-away portion of valve stem 10, such block 32 carrying a pin 33 pivotally receiving a link 24ª similar to member 24 above described.

In Fig. 5 I have illustrated a valve mechanism, which, although operating upon the principles above described, is somewhat modified in mechanical construction. Referring to this figure, the inlet passage 7ª is separated from the exhaust valve 11ª by a fixed diaphragm 7ᵇ, and the inlet valve 10ª is tuliplike in shape, which above mentioned construction of parts I have found to facilitate the free and unimpeded flow of gas to the inlet port 5ª, when the valve is open. The exhaust gases flow from exhaust port 9ª through an exhaust passage 8ª which preferably surrounds the inlet passage 7ª above mentioned.

The valves are operated by a rod 29ª and sleeve 19ª similar respectively to the carts 29 and 19 above described, and the actuating mechanism for the valves in a general way is similar to the one previously described, except that such mechanism is located at the side of the engine in a position where it may be readily housed within an extension of the crank case. For clearness only the parts of the inlet valve operating mechanism are shown in Fig. 5, but it will be understood that the exhaust valve operating mechanism may be combined therewith and related thereto as described in connection with Fig. 1.

The valve actuating mechanism may be driven from an auxiliary shaft 15ª, driven at half speed from the crank shaft 4ª, by means of sprockets 16ª, 17ª and chain 18ª. The stem 19ª of the inlet valve extends outwardly through a valve head 20ª, and is actuated from shaft 15ª through the medium of a connecting rod 21ª, a rocker arm 22ª, link 24ª, arm 25ª and link 28ª, all operating in the same way as the corresponding parts previously described in connection with Fig. 1.

In both of the above described forms of the invention the valves are water-jacketed for cooling purposes, and are provided with piston rings at each end to insure against leakage on both the compression and explosion strokes.

This application is a continuation in part of my prior application Serial No. 628,406 filed March 29, 1923, entitled Valve mechanism for internal combustion engines.

While certain specific embodiments of the invention have been described, it will be obvious that many changes may be made therein without departing from its principles as defined in the appended claims.

I claim:

1. An internal combustion engine having a cylinder provided with inlet and exhaust ports, a valve adapted to travel back and forth across one of said ports to open and close the same, an actuating mechanism positively connected to said valve, said actuating mechanism including means for accelerating the motion of the valve as it passes the port, a second valve for the other of said ports, and a separate actuating mechanism for said second mentioned valve.

2. An internal combustion engine having a cylinder provided with inlet and exhaust ports, a valve adapted to travel back and forth across said inlet port to open and close the same, and an actuating mechanism for said valve operating to hold the valve open for a period greater than 180° in the travel of the piston, said actuating mechanism being positively connected to said valve, a second valve for the exhaust port and a separate actuating mechanism for said exhaust valve.

3. An internal combustion engine having a cylinder provided with inlet and exhaust ports, a valve adapted to travel back and forth across said inlet port to open and close the same, an actuating mechanism for said valve operating to hold the same open for a period greater than 180° in the travel of the piston, said actuating mechanism being positively connected to said valve and including means for accelerating the motion of the valve as it passes the port, a second valve for the exhaust port and a separate second actuating mechanism for said exhaust valve.

4. An internal combustion engine of the four cycle type having a cylinder provided with inlet and exhaust ports, a valve adapted to travel back and forth across one of said ports to open and close the same, an auxiliary shaft driven at half engine speed, an actuating mechanism for said valve deriving its motion solely from said shaft, said actuating mechanism being positively connected to said valve and including means for accelerating the motion of the valve as it passes its port.

5. In combination, an internal combustion engine cylinder having a port therein, a piston valve adapted to travel back and forth across said port to open and close the same, and an actuating mechanism for said valve positively connected thereto, said mechanism including a rocker arm, and means whereby the radial distance of the force applied to said rocker arm to its center of oscillation is altered to accelerate the motion of the valve as it passes the port.

6. In combination, an internal combustion engine cylinder having a port therein, a valve adapted to travel across said port to open and close the same, and an actuating mechanism positively connected to said valve, said actuating mechanism including an angularly moving member with means for applying force thereto at varying distances from its centre of angular motion, to accelerate the motion of the valve as it passes the port.

7. In combination, an internal combustion engine cylinder having a port therein, a valve adapted to travel back and forth across said port to open and close the same, and an actuating mechanism positively connected to said valve, said mechanism comprising an eccentrically driven connecting rod, a rocker arm moved thereby, and a pivoted arm connected to said connecting rod to vary the radius of action of the latter on said rocker arm, thereby to accelerate the motion of the valve as it passes the port.

8. In combination, an internal combustion engine cylinder having a port therein, a single valve adapted to travel back and forth to cover and uncover said port, and means for actuating said valve comprising a linkage mechanism positively connected thereto and comprising a rocking lever having a radius shortening device associated therewith to accelerate the motion of the valve at the time of opening.

9. In combination, an internal combustion engine cylinder having a port therein, a single valve adapted to travel back and forth to cover and uncover said port, means for actuating said valve comprising a crank-operated linkage mechanism positively connected thereto, and acting to maintain said valve in open position for a period longer than one-half a revolution of said crank, an auxiliary shaft driven at half engine speed, said linkage mechanism being driven solely from such shaft.

10. In combination, an internal combustion engine cylinder having a port therein, a single valve adapted to travel back and forth to cover and uncover said port, means for actuating said valve comprising a crank-operated linkage mechanism positively connected thereto, and acting to maintain said valve in open position for a period longer than one-half a revolution of said crank, together with a device for accelerating the motion of the valve as it opens and closes the port, an auxiliary shaft driven at half engine speed, said linkage mechanism being driven solely from such shaft.

11. In combination, an internal combustion engine cylinder having inlet and exhaust ports therein, separate piston valves respectively adapted to travel back and forth across said ports to open and close the same, a fixed diaphragm interposed between said valves, and an inlet gas passageway leading to the space between said diaphragm and the inlet valve.

12. In combination, an internal combustion engine cylinder having a port therein, a valve adapted to travel back and forth to cover and uncover said port, means positively connected to said valve for actuating the same comprising a rocker arm connected thereto, a connecting rod for imparting rocking movement to said rocker arm, and means for shifting the radial distance from the connecting rod to the center of oscillation of said rocker arm thereby to accelerate the motion of the valve as it passes the port.

13. In combination, an internal combustion engine cylinder having a port therein, a valve adapted to travel back and forth to cover and uncover said port, means positively connected to said valve for actuating the same comprising a rocker arm connected thereto, a connecting rod for imparting rocking movement to said rocker arm, and means for shifting the radial distance from the connecting rod to the center of oscillation of said rocker arm, thereby to accelerate the motion of the valve as it passes the port, said means comprising a pivoted arm connected to said connecting rod.

14. In combination, an internal combustion engine cylinder having inlet and exhaust ports therein, a piston valve adapted to travel back and forth across said inlet port to open and close the same, and an actuating mechanism positively connected to said valve, comprising a rocker arm connected thereto, a connecting rod for imparting rocking movement to said rocker arm, means for varying the radial distance from said connecting rod to the center of oscillation of said rocker arm, and an auxiliary shaft driven at half engine speed for driving said connecting rod, whereby said actuating mechanism operates to hold the inlet valve open for a period greater than 180° in the travel of the piston, and accelerates the motion of the valve as the latter opens and closes the inlet port.

In testimony that I claim the foregoing I have hereunto set my hand this 29th day of December, 1924.

CLIFTON REEVES.